United States Patent
Takamiya

(10) Patent No.: US 8,390,863 B2
(45) Date of Patent: Mar. 5, 2013

(54) IMAGE PROCESSING APPARATUS AND IMAGE PROCESSING METHOD

(75) Inventor: Hiroyoshi Takamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/117,012

(22) Filed: May 26, 2011

(65) Prior Publication Data

US 2011/0228333 A1 Sep. 22, 2011

Related U.S. Application Data

(60) Continuation of application No. 11/848,228, filed on Aug. 30, 2007, now Pat. No. 7,969,600, which is a division of application No. 09/948,602, filed on Sep. 10, 2001, now Pat. No. 7,292,359.

(30) Foreign Application Priority Data

| Sep. 12, 2000 | (JP) | 2000-277244 |
| Oct. 27, 2000 | (JP) | 2000-329425 |
| Sep. 5, 2001 | (JP) | 2001-269453 |

(51) Int. Cl.
G06F 15/00 (2006.01)
G06F 3/12 (2006.01)
G06F 15/173 (2006.01)
G06K 15/00 (2006.01)

(52) U.S. Cl. ........ 358/1.15; 358/1.16; 358/1.13; 358/1.1; 709/224

(58) Field of Classification Search ........ 358/1.1, 358/1.13, 1.15, 1.16; 707/2, 10, 203, 204; 709/224; 370/229

See application file for complete search history.

(56) References Cited

U.S. PATENT DOCUMENTS

| 5,754,308 A * | 5/1998 | Lopresti et al. ........ 358/403 |
| 5,971,277 A * | 10/1999 | Cragun et al. ........ 235/462.01 |
| 5,991,514 A | 11/1999 | Nielsen |
| 6,038,034 A | 3/2000 | Nisho et al. |
| 6,341,304 B1 | 1/2002 | Engbersen et al. |
| 6,362,894 B1 | 3/2002 | Shima |
| 6,537,324 B1 | 3/2003 | Tabata et al. |
| 6,867,874 B1 | 3/2005 | Shima |
| 7,043,473 B1 | 5/2006 | Rassool et al. |
| 7,239,409 B2 * | 7/2007 | Parry ........ 358/1.15 |
| 7,274,474 B2 | 9/2007 | Yamaguchi et al. |
| 2002/0196460 A1 * | 12/2002 | Parry ........ 358/1.15 |

FOREIGN PATENT DOCUMENTS

| EP | 0 814 424 A1 | 12/1997 |
| EP | 0 820 185 A2 | 1/1998 |
| EP | 0 899 942 A2 | 3/1999 |
| EP | 0 929 031 A2 | 7/1999 |
| JP | 04305777 A | 10/1992 |

(Continued)

OTHER PUBLICATIONS

Office Action, dated Jan. 29, 2009, in EP 01 307 723.5.

(Continued)

*Primary Examiner* — Thomas Lett
(74) *Attorney, Agent, or Firm* — Fitzpatrick, Cella, Harper & Scinto

(57) ABSTRACT

Print data is input from a computer, and a main translator of an image processing apparatus analyzes the print data, and performs an output data process. In addition, a sub-translator analyzes the print data, performs an external reference data obtaining process through a network, holds the obtained external reference data in a storage device, and manages the data in a resource management table. When the main translator requires the external reference data, it performs the output data process using the external reference data managed in the resource management table. Thus, the output data process and the external resource pre-reading process are simultaneously performed, thereby improving the throughput of the entire system.

10 Claims, 20 Drawing Sheets

FOREIGN PATENT DOCUMENTS

| | | |
|---|---|---|
| JP | 07295771 A | 11/1995 |
| JP | 08221227 | 8/1996 |
| JP | 10-207658 A | 8/1998 |
| JP | 10-207756 A | 8/1998 |
| JP | 10-240457 A | 9/1998 |
| JP | 10-275064 A | 10/1998 |
| JP | 10-320337 | 12/1998 |
| JP | 11-003186 A | 1/1999 |
| JP | 11-175527 | 7/1999 |
| JP | 11-283006 A | 10/1999 |
| JP | 2000-43376 A | 2/2000 |
| JP | 2000-66866 A | 3/2000 |
| JP | 2000-141783 A | 5/2000 |
| JP | 2000-163243 A | 6/2000 |
| JP | 2000-163244 A | 6/2000 |

OTHER PUBLICATIONS

Search Report, dated Apr. 16, 2003, in European Application No. 01 30 7723.

* cited by examiner

FIG. 4

| ID | URI | Time stamp |
|---|---|---|
| 1 | http://www.eanon.co.jp/···/ | 2000/06/01 10:00:00 |
| 2 | http://www.w3c.org/···/ | 2000/06/12 12:30:15 |
| ⋮ | ⋮ | ⋮ |

FIG. 8

| ID (801) | URI (802) | Time stamp (803) | REFERENCE FREQUENCY COUNTER (804) |
|---|---|---|---|
| 1 | http://www.eanon.co.jp/.../ | 2000/06/01 10:00:00 | 5 |
| 2 | http://www.w3c.org/.../ | 2000/06/12 12:30:15 | 3 |
| ... | ... | ... | ... |

| Page No. | Page Status |
|---|---|
| 1 | AWAITING IMAGE TO BE OBTAINED |
| 2 | COMPLETING TRANSLATION |
| 3 | AWAITING IMAGE TO BE OBTAINED |
| ... | ... |
| 10 | PAGE BEING PROCESSED |

IMAGE PROCESSING APPARATUS AND IMAGE PROCESSING METHOD

This application is a continuation of U.S. application Ser. No. 11/848,228, filed Aug. 30, 2007 (allowed), which is a divisional of U.S. application Ser. No. 09/948,602, filed Sep. 10, 2001 (now U.S. Pat. No. 7,292,359), the contents of each of which are incorporated by reference herein.

FIELD OF THE INVENTION

The present invention relates to an image processing apparatus and an image processing method for processing output data based on the print data from a host computer.

BACKGROUND OF THE INVENTION

Recently, with an increasing number of various digital copying machines widely spread, systems capable of connecting various interface devices to the digital copying machines and outputting image data from the host computer have been developed.

However, since these systems sequentially interpret input document data when a document referring to external data is output, and obtain the external data when an external data reference instruction is issued, an output data process is suspended until an external data obtaining process has been completed, thereby reducing the throughput of the entire system.

Additionally, since these systems sequentially interpret input document data when a document referring to external data is output, and if an external data reference instruction is actually issued, obtain the external data each time the external data reference instruction is actually issued, data can be wastefully obtained when a plurality of documents refer to the same external data.

Furthermore, when external data is obtained in the same job, and when it takes a long time to obtain data due to the delay in a network, etc. the data is waited without processing other jobs or pages, thereby reducing the throughput of the entire system.

SUMMARY OF THE INVENTION

The present invention has been developed to solve the above mentioned problems. An object of the present invention is to provide an image processing apparatus and an image processing method capable of simultaneously performing an output data process and an external resource pre-reading process to improve the throughput of the entire system.

Another object of the present invention is to effectively utilize the resources by deleting and updating the resources based on the frequency at which fetched resources are referred to.

A further object of the present invention is to save the document data of a job or a page requiring external data in a storage device when the external data cannot be obtained in the job or the page, process the document data of the next job or the next page, and improve the throughput of the entire system.

To attain the above mentioned purpose, an image processing apparatus performing an output data process based on print data, comprising: input means for inputting the print data; first process means for analyzing the input print data, and generating output data; and second process means for analyzing the input print data, and obtaining data linked from the print data through a network, wherein said first process means performs an output data process using data obtained by said second process means when the linked data is required, is provided according to an aspect of the present invention.

According to another aspect of the present invention, an image processing apparatus performing an output data process based on print data, comprising: input means for inputting the print data; first process means for analyzing the input print data, and generating output data; second process means for analyzing the input print data, and obtaining data linked from the print data through a network; and management means for managing the data obtained by said second process means, wherein said management means manages the data depending on the frequency at which data is referred to, is provided.

According a further aspect of the present invention, an image processing apparatus performing an output data process based on print data, comprising: input means for inputting plural pages of the print data; first process means for analyzing input print data, and generating output data; and second process means for obtaining data linked from the print data through a network, wherein when said second process means cannot obtain data, said first process means suspends a process on a corresponding page, and starts analyzing the print data of a subsequent page, is provided.

According to a further aspect of the present invention, an image processing apparatus performing an output data process based on print data, comprising: input means for inputting the print data of a plurality of jobs; first process means for analyzing input print data, and generating output data; and second process means for obtaining data linked from the print data through a network, wherein when said second process means cannot obtain data, said first process means suspends a process on a corresponding job, and starts analyzing the print data of a subsequent job, is provided.

Other objects of the present invention are more clearly described by referring to the attached drawings and detailed descriptions below.

BRIEF DESCRIPTION OF THE DRAWINGS

FIG. 4 shows the configuration of the resource management table according to the first embodiment of the present invention;

FIG. 8 shows the configuration of the resource management table according to a third embodiment of the present invention;

FIG. 17 shows the page status management table according to the sixth embodiment of the present invention;

DETAILED DESCRIPTION OF THE PREFERRED EMBODIMENT

The embodiments of the present invention are described below by referring to the attached drawings.

First Embodiment

Figure 1:
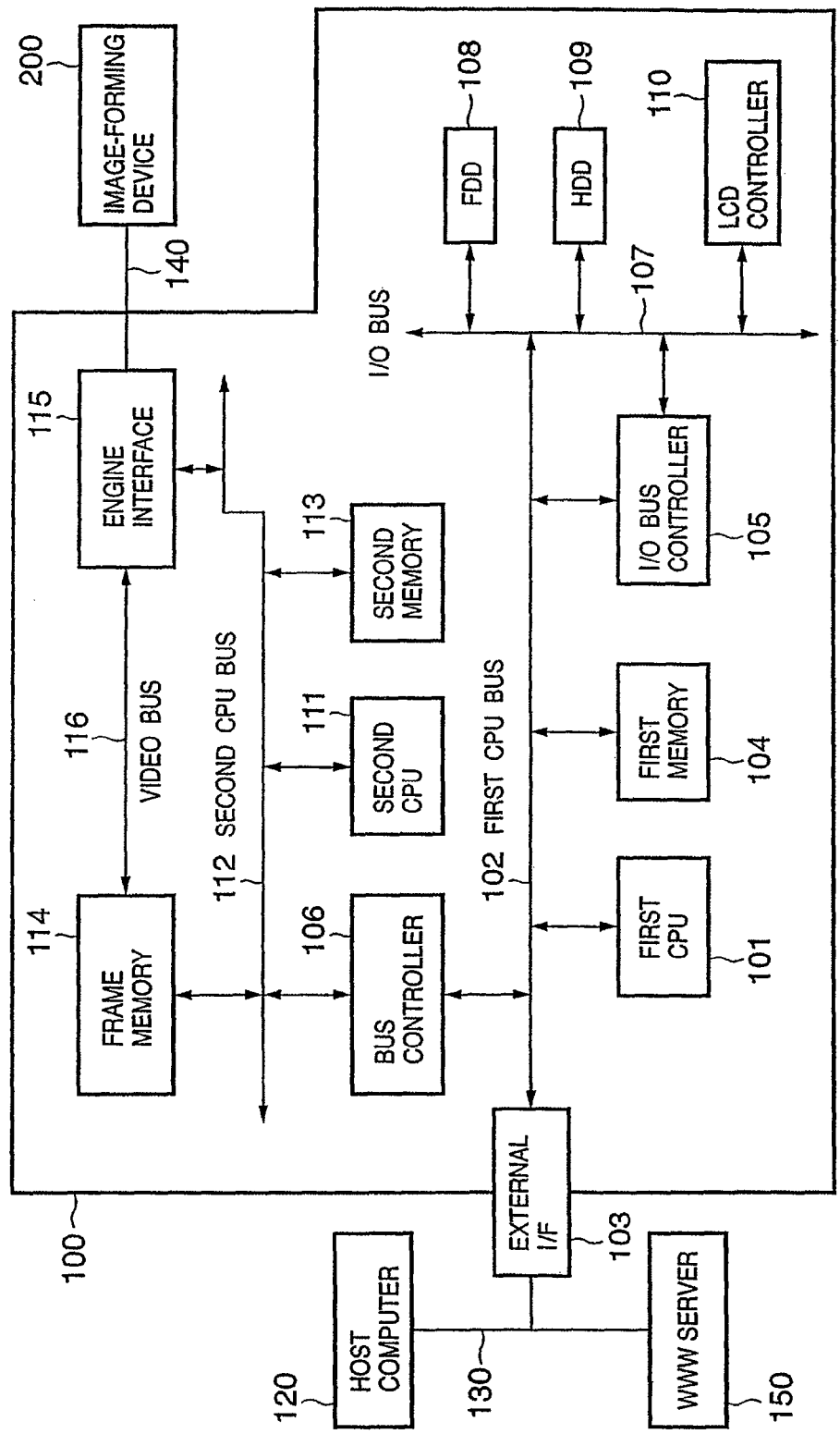
FIG. 1 shows the configuration of the image processing system according to a first embodiment of the present invention.

FIG. 1 shows the configuration of the image processing system according to the first embodiment of the present invention. In FIG. 1, reference numeral 100 denotes an image processing apparatus according to the present invention, reference numeral 120 denotes a host computer, reference numeral 130 denotes a network, reference numeral 140 denotes an interface cable, reference numeral 150 denotes a WWW server, reference numeral 200 denotes an image-forming device described later in detail. The image processing apparatus 100 inputs as print data the document data described in an XML-base language such as XHTML, SVG, etc. from the host computer 120 through the network 130, analyzes the print data, obtains data from the host computer 120 or the WWW server 150 using the identification information specifying external resources, for example, a URI (uniform resource identifier) if the data contains a command to refer to the external resources described later, and simultaneously performs an external resource fetching process and a printing process on the image-forming device 200, thereby enhancing the throughput of the entire system.

External resources refer to image data, graphic data, etc. linked from the document data, and stored in a file different from the file of the document data.

In the example shown in FIG. 1, the image processing apparatus 100 is externally connected to the image-forming device 200 through the interface cable 140, but can be built together with the image-forming device 200 in the same housing.

Furthermore, although the host computer 120 is connected through the network 130, but it is obvious that the present invention is applicable when it is locally connected to the image processing apparatus 100.

In the image processing apparatus 100, reference numeral 101 denotes a first CPU for controlling an input/output unit I/O other than the externally connected image-forming device 200 through a first CPU bus 102. To the first CPU bus 102, connected are an external I/F 103 which is an interface to the network 130, first memory 104 storing the control program, etc. of the first CPU bus 102, and an I/O bus controller 105 for controlling an I/O bus described later. A bus controller 106 is also connected to the first CPU bus 102 so that connection is made to a second CPU bus of a second CPU described later.

Reference numeral 107 denotes an I/O bus controlled by the I/O bus controller 105. A floppy disk drive (FDD) 108, a hard disk drive (HDD) 109, an LCD controller 110, and a general purpose I/O, such as an operation unit not shown in the attached drawings are connected to the I/O bus 107.

Reference numeral 111 denotes a second CPU for controlling the printing operation for the image-forming device 200 and developing image data to be stored in the frame memory described later. Reference numeral 112 denotes a second CPU bus connected to the first CPU bus 102 through the bus controller 106. Reference numeral 113 denotes second memory into which a control program, etc. is loaded from the hard disk drive 109 through the bus controller 106. The second memory 113 is also used for communications with the first CPU 101.

Reference numeral 114 denotes frame memory storing image data developed based on the print data from the host computer 120. Reference numeral 115 denotes an engine interface for controlling the image-forming device 200, while conducting various settings. Reference numeral 116 denotes a video bus exclusively used for transmitting image data developed by the second CPU 111 and stored in the frame memory 114 to the engine interface 115.

When the external I/F 103 receives print data from the host computer 120 through the network 130, and fetches (pre-reads) the external resources described later, it controls access to the external network through a router and a server not shown in the attached drawings according to the location information (URI) about the external resources based on the protocol such as the HTTP, etc.

Described below is the configuration and the operation of the image-forming device 200 connected to the image processing apparatus 100.

Figure 2:
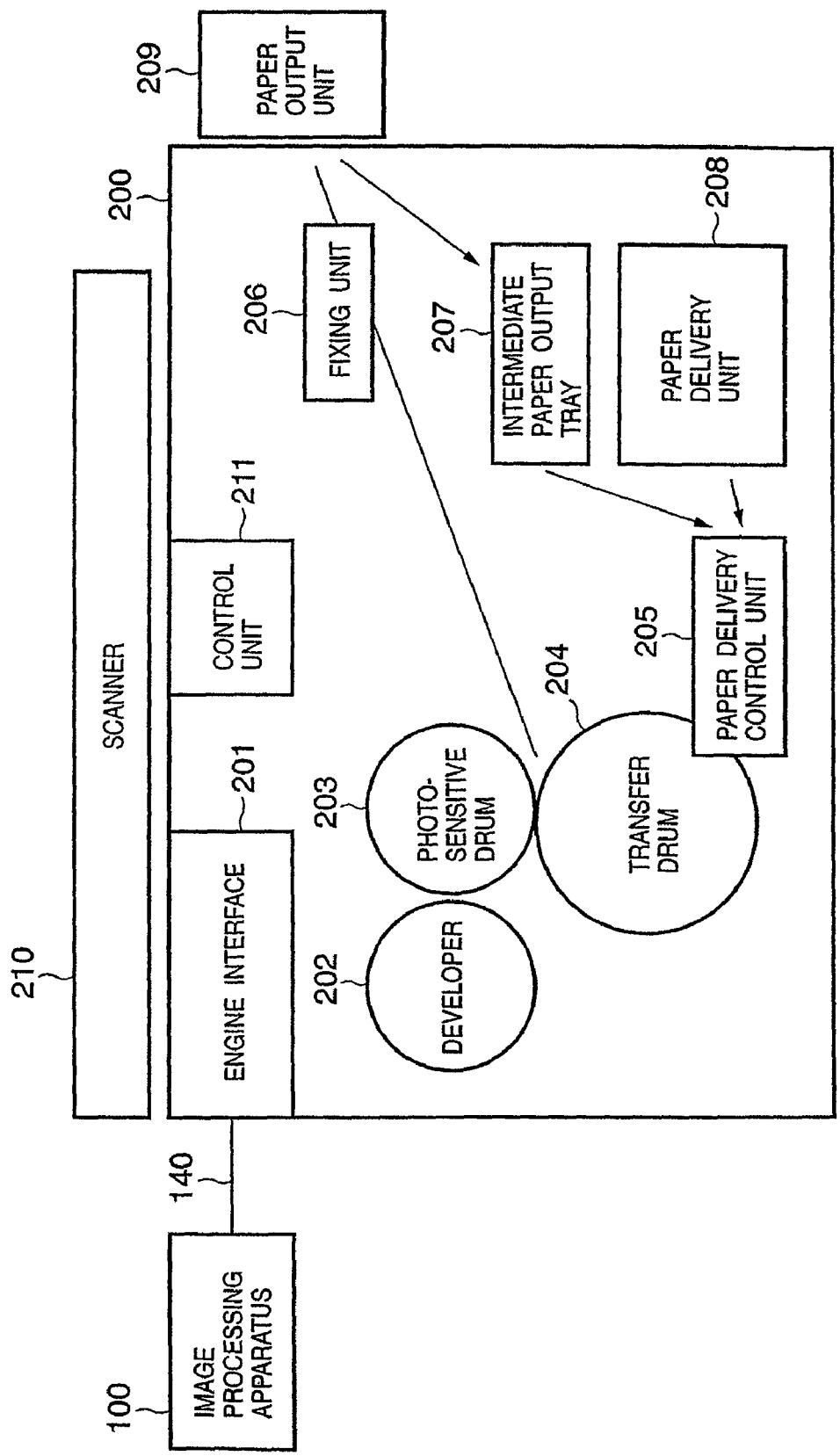
FIG. 2 shows the structure of the image processing apparatus according to the first embodiment of the present invention.

FIG. 2 shows the structure of the image-forming device according to the first embodiment of the present invention. In FIG. 2, reference numeral 201 denotes an engine interface for transmitting and receiving data to and from the image processing apparatus 100 through the interface cable 140. The image data transmitted from the image processing apparatus 100 is expressed as a latent image on a photosensitive drum 203, and formed as an image by a developer 202. A paper delivery control unit 205 delivers paper from a paper delivery unit 208 or an intermediate paper output tray 207 at an instruction from the image processing apparatus 100, and sets the paper on a transfer drum 204.

Then, the image formed on the photosensitive drum 203 is transferred on the paper set on the transfer drum 204, and the image is fixed by a fixing unit 206. After fixing the image, the paper is either output to a paper output unit 209 or stored in the intermediate paper output tray 207 at an instruction of the image processing apparatus 100. Furthermore, the image data read from a scanner 210 is processed by a control unit 211, and printed as the image data transmitted from the image processing apparatus 100 is printed.

In the example shown in FIG. 2, a digital copying machine is described as an image-forming device. However, the present invention is not limited to this example, and can obviously be applied to a printer.

Described below is the process when the image processing apparatus 100 pre-reads external reference data.

Figure 3:
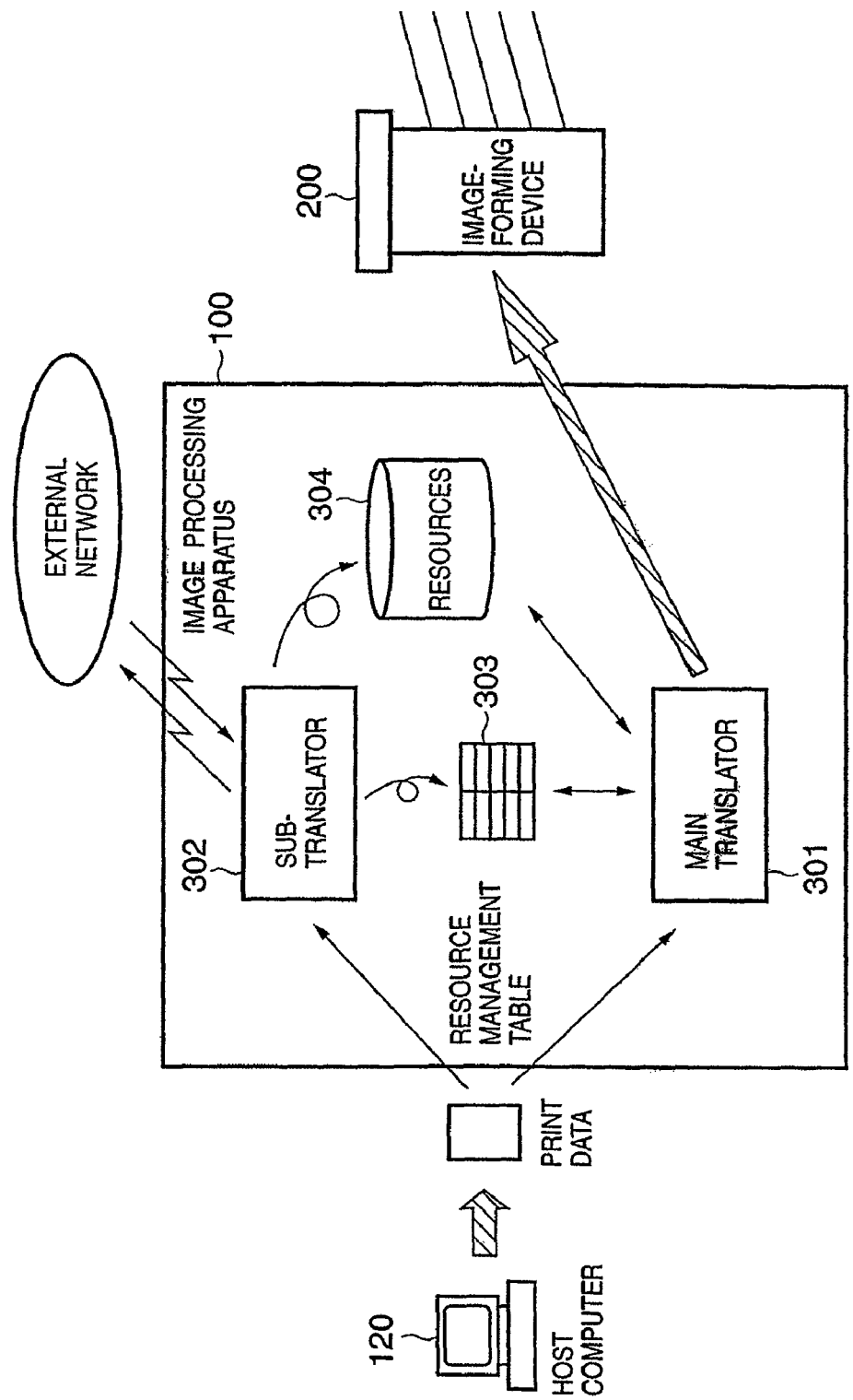
FIG. 3 is an explanation view showing the external resource process according to the first embodiment of the present invention.

FIG. 3 shows the command process according to the first embodiment of the present invention. In FIG. 3, reference numeral 301 denotes a main translator (interpreter) which is a module to be executed by the above mentioned second CPU 111, and process all print commands for print data input from the host computer 120. That is, the main translator 301 sequentially performs command processes. When a command to refer to external resources is issued, a resource management table 303 described later is referred to. If the resources have already been fetched by a storage device 304, a drawing process is performed using the resources. If they have not been fetched yet, then they are awaited. The image data generated in the drawing process performed based on the print data is transmitted to the image-forming device 200 and printed.

Reference numeral 302 denotes a sub-translator (simple interpreter) which is a module executed by the first CPU 101, and performs only an external resource fetching process. That is, the sub-translator 302 analyzes the print data, accesses the location of the external resources through the external I/F 103 if the print data contains a command to refer to the external resources, fetches the external resources, and stores them in the storage device 304. Simultaneously, it assigns a unique ID to the fetched external resources, and records the external resources in the resource management table 303 with the location information about the external resources associated with the time at which the external resources are fetched. At this time, the sub-translator 302 transmits a command to request the external resources to the network using an HTTP (hyper text transfer protocol).

Described below is the resource management table 303 for management of the external resources stored in the storage device 304. The storage device 304 is controlled by the hard disk drive (HDD) 109 shown in FIG. 1, and the resource management table 303 is defined in the second memory 113.

FIG. 4 shows the configuration of the resource management table according to the first embodiment. As shown in FIG. 4, on the resource management table, a unique ID is assigned to access the external resources fetched to the storage device 304. As the location information about the resources, the URI of the resources is stored, and the time stamp is also stored for confirmation of the time at which the resources have been fetched.

Described below are the processes performed by the main translator 301 and the sub-translator 302 when the external reference data is pre-read.

Figure 5:
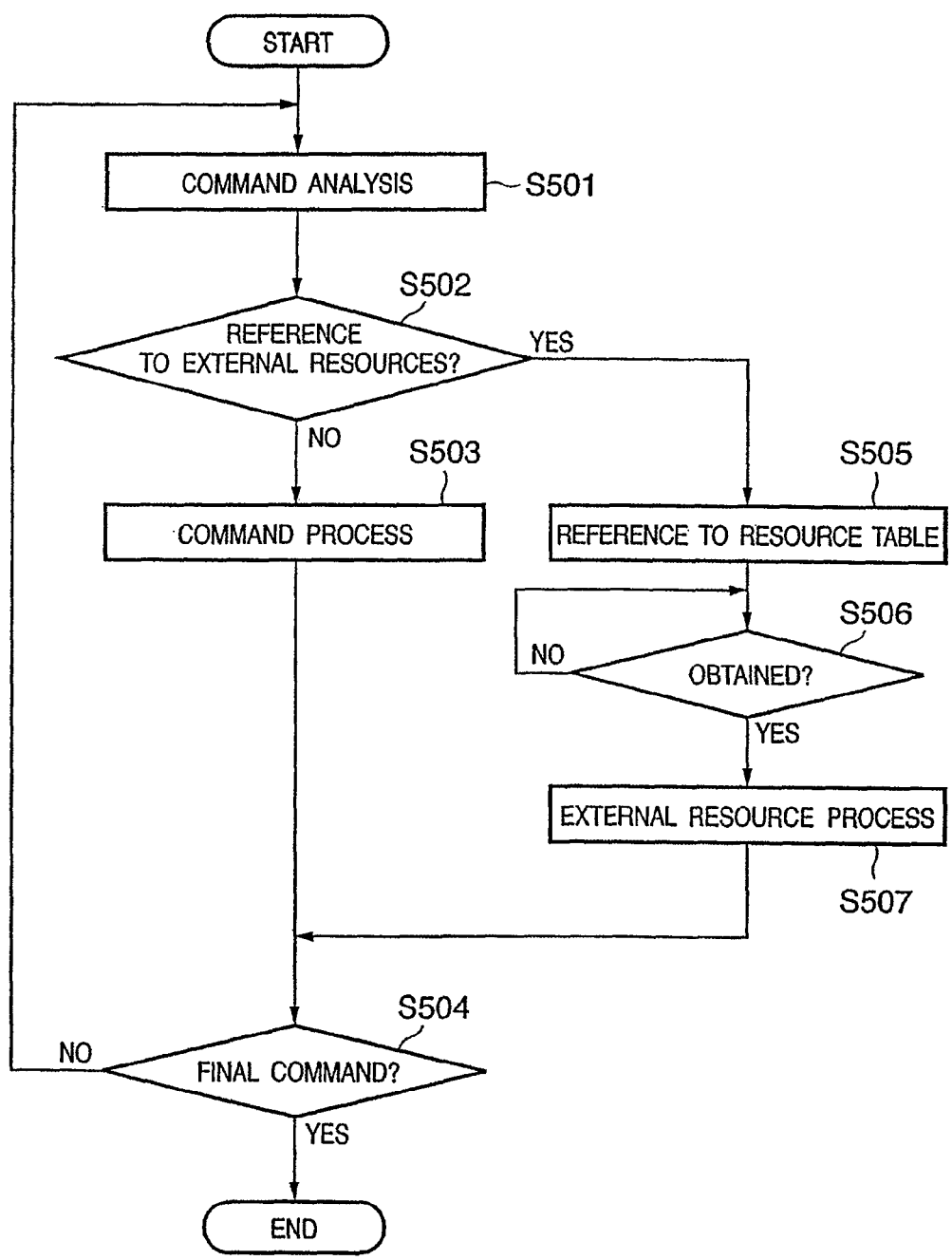
FIG. 5 is a flowchart of the command process by a main translator 301 according to the first embodiment of the present invention.
Figure 6:
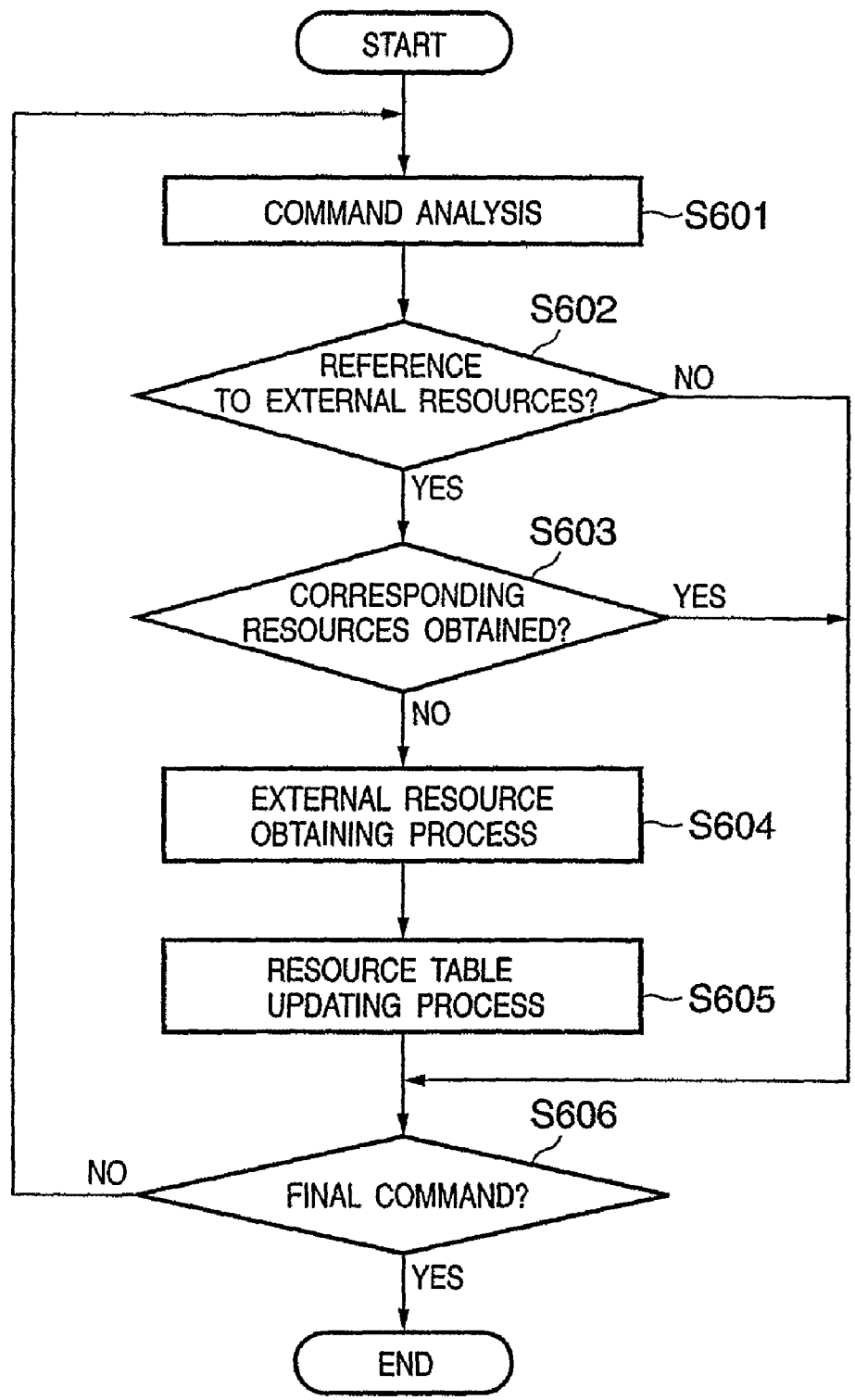
FIG. 6 is a flowchart of the command process by a sub-translator 302 according to the first embodiment of the present invention.

FIG. 5 is a flowchart of the command process performed by the main translator 301 according to the first embodiment. FIG. 6 is a flowchart of the command process performed by the sub-translator 302 according to the first embodiment.

First, in step S501, a command of the input print data is analyzed. In step S502, it is checked whether or not the command the command has been issued to refer to external resources. If a command is not issued to refer to external resources, control is passed to step S503, and the command process is performed. In the process in step S503, a drawing process is performed according to the command to generate image data. Then, in step S504, it is checked whether or not the command is the final command. If it is not the final command, then control is returned to step S501, and the subsequent command is analyzed. If it is determined in step S504, that the command is the final command, then the process terminates.

On the other hand, if it is determined in step S502 that the command has been issued to refer to the external resources, then control is passed to step S505 to refer to the resource management table 303. If the requested resources have not been fetched in step S506, then fetching the resources by the sub-translator 302 is awaited. If the requested resources have been fetched, then control is passed to step S507, and the external resource process is performed. In the external resource process in step S507, image data is generated such that the obtained external resources can be printed in the format in which they are inserted. Then, control is passed to step S504 to check whether or not the command is the final command. If it is not the final command, then the above mentioned process is performed. If it is the final command, then the process terminates.

On the other hand, the sub-translator 302 performs an external resource obtaining process according to the flowchart shown in FIG. 6. In step S601 shown in FIG. 6, a command of the input print data is analyzed, and it is checked in step S602 whether or not the command has been issued to refer to the external resources. If the command is not issued to refer to the external resources, then control is passed to step S606, and it is checked whether or not the command is the final command. If it is not the final command, control is returned to step S601, and the subsequent command is analyzed. If it is the final command, then the process terminates.

If it is determined in step S602 that the command has been issued to refer to the external resources, then control is passed to step S603, and it is checked whether or not the resources have already been obtained. If the resources have already been obtained, then control is passed to step S606, and the above mentioned process is performed. If the resources have not been obtained, then control is passed to step S604, the external resources are obtained from the external I/F 103, and the resource management table 303 is updated in step S605. Then, control is passed to step S606, and the above mentioned process is performed.

According to the first embodiment, a main translator (interpreter) for doing a normal data analysis and a sub-translator (simple interpreter) only for referring to resources are used when an image process is performed by fetching the resources in the network so that one translator analyzes data, the other translator fetches resources, and locally fetched resources are used to output data. As a result, the locally fetched resources can be used when they are actually required, and the time taken in fetching external resources, which is normally considerably long, can be shortened, thereby enhancing the throughput of the entire system.

Second Embodiment

The second embodiment of the present invention is described below in detail by referring to the attached drawings.

According to the first embodiment, all external resources are obtained by the sub-translator 302 in advance, and the main translator 301 shall use the resources stored in the storage device 304. However, the original data of specific resources can be frequently updated, and it is desired to use the latest resources.

Therefore, according to the second embodiment, the resource obtaining process is forcibly performed on the specific resources so that the latest possible resources can be obtained.

The configuration of the image processing apparatus 100 according to the second embodiment is the same as that according to the first embodiment, and only the difference from the first embodiment is described below.

First, according to the second embodiment, the specific resources to be forcibly obtained are specified by the host computer 120 or the operating unit of the image processing apparatus 100. As in the first embodiment, the command process is performed by the main translator 301 and the sub-translator 302.

Described below is the process of forcibly obtaining external resources when the external reference data is pre-read.

Figure 7:
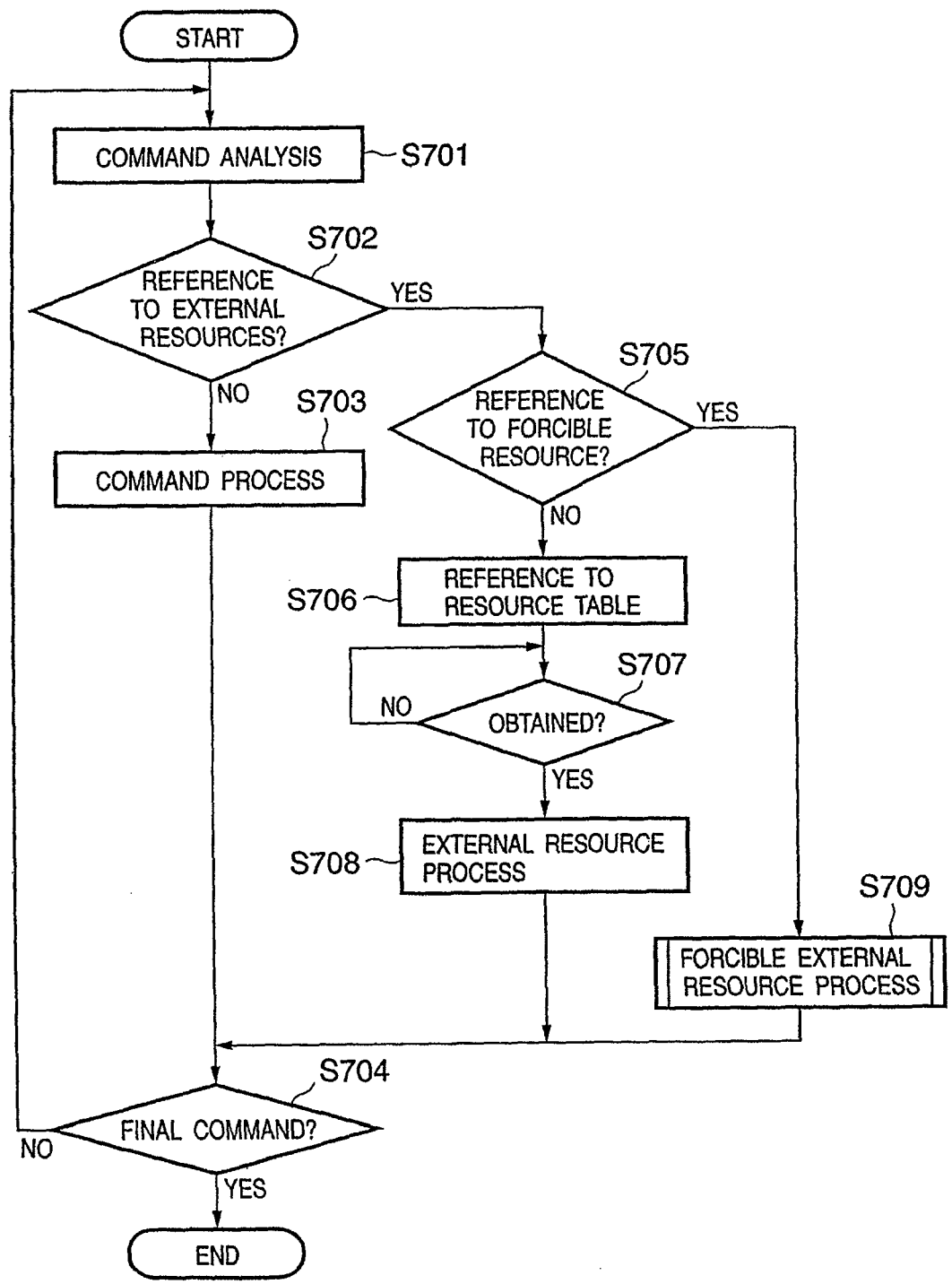
FIG. 7 is a flowchart of the resource forcibly obtaining process by the main translator according to a second embodiment of the present invention.

FIG. 7 is a flowchart of the process of forcibly obtaining resources by the main translator. First, in step S701, the command of the input print data is analyzed. In step S702, it is checked whether or not the command has been issued to refer to external resources. If the command has not been issued to refer to the external resources, control is passed to step S703, and the command is processed. Then, in step S704, it is checked whether or not the command is the final command. If it is not the final command, control is returned to step S701, and the subsequent command is analyzed. If it is the final command in step S704, the process terminates.

On the other hand, if it is determined in step S702 that the command has been issued to refer to the external resources, then control is passed to step S705, and it is further checked whether or not an instruction to forcibly obtain the external resources has been issued. If the instruction has been issued, then control is passed to step S709, the process of forcibly obtaining the external resources is performed, and control is passed to step S704. In the forcible external resource obtaining process in step S709, an instruction is issued directly to the sub-translator 302 to obtain specified external resources. Then, image data is generated based on the forcibly obtained external resources. If the instruction to forcibly obtain the external resources has not been issued, then control is passed to step S706 to refer to the resource management table 303. Then, if the requested resources have not been obtained yet in step S707, then obtaining the resources by the sub-translator 302 is awaited. If the requested resources have already been obtained, then control is passed to step S708, the process of referring to the external resources is performed, and control is passed to step S704.

According to the second embodiment, the latest data of the resources whose original data is frequently updated can be used by forcibly obtaining specific resources in addition to the effect of the first embodiment.

According to the second embodiment, specific resources are selected and forcibly obtained. However, all resources can be forcibly obtained. In this case, all resources are forcibly obtained, but referencing external resources in the same document does not obtain the resources again, thereby successfully improving the throughput of the entire system.

As described above, according to the first and second embodiments, since the process of outputting data and the process of pre-reading external resources can be simultaneously performed, the throughput of the entire system can be enhanced.

Third Embodiment

The third embodiment of the present invention is described below in detail by referring to the attached drawings.

The configuration of the image processing system according to the third embodiment is the same as the configurations of the image processing systems according to the first and second embodiments described above by referring to FIGS. 1 to 3. Therefore, the detailed explanation is omitted here.

According to the third embodiment, resources can be deleted or updated depending on the frequency of reference to the fetched resources in addition to the external resources process according to the first and second embodiments. As a result, the resources can be effectively utilized, and the convenience can be improved for users.

That is, the main translator 301 shown in FIG. 3 performs a serial command process, and determines whether or not the external resources have been fetched to the storage device 304 by referring to the resource management table 303 when the command to refer to the external resources is detected. If the external resources have already been fetched, the main translator 301 updates a reference frequency counter described later, and then performs the printing process using the external resources. If the external resources have not been fetched yet, it awaits the external resources to be fetched. The sub-translator 302 checks the reference frequency counter recorded in the resource management table at predetermined time intervals, and deletes the external resources if the count value of the reference frequency counter is smaller than the deletion frequency, and automatically updates the external resources if the count value is larger than the update frequency. The deletion frequency used in the deletion determination and the update frequency used in the automatic update determination can have the same or different values.

The resource management table containing the reference frequency counter is described below. The resource management table according to the third embodiment is stored in the storage device 304 as in the first embodiment.

FIG. 8 shows the configuration of the resource management table according to the third embodiment of the present invention. As shown in FIG. 8, a resource management table 800 is assigned a unique ID 801 for access to the external resources fetched to the storage device 304 shown in FIG. 3, stores a URI 802 of the external resources as the location information about the resources, and stores a time stamp 803 for confirmation of the time at which the external resources were fetched. A reference frequency counter 804 is updated by a command to refer to external resources, and deletes or automatically updates the external resources.

Described below is the command process performed by the main translator 301 and the sub-translator 302 when the external reference data is pre-read.

Figure 9:
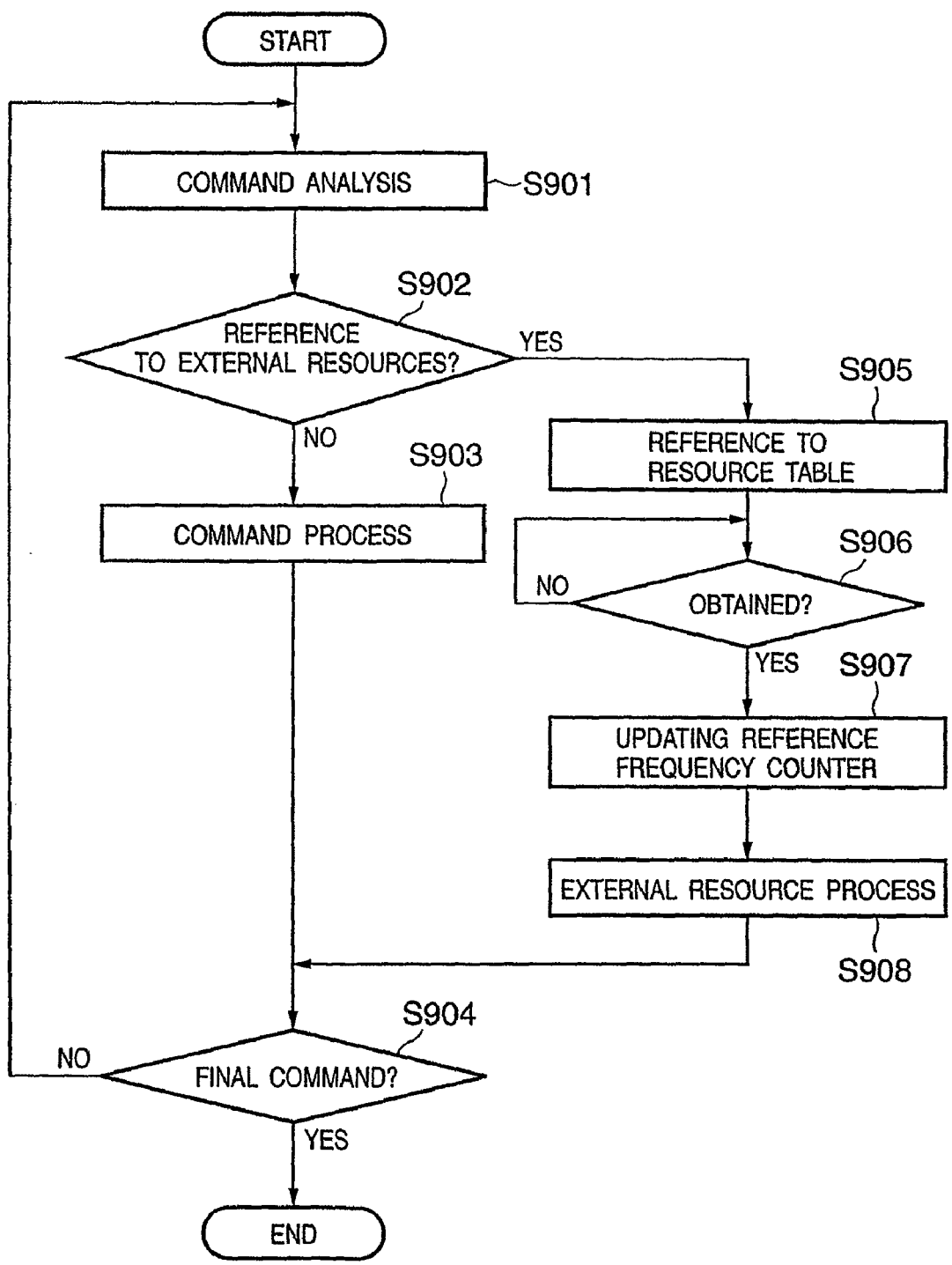
FIG. 9 is a flowchart of the command process by the main translator 301 according to the third embodiment of the present invention.
Figure 10:
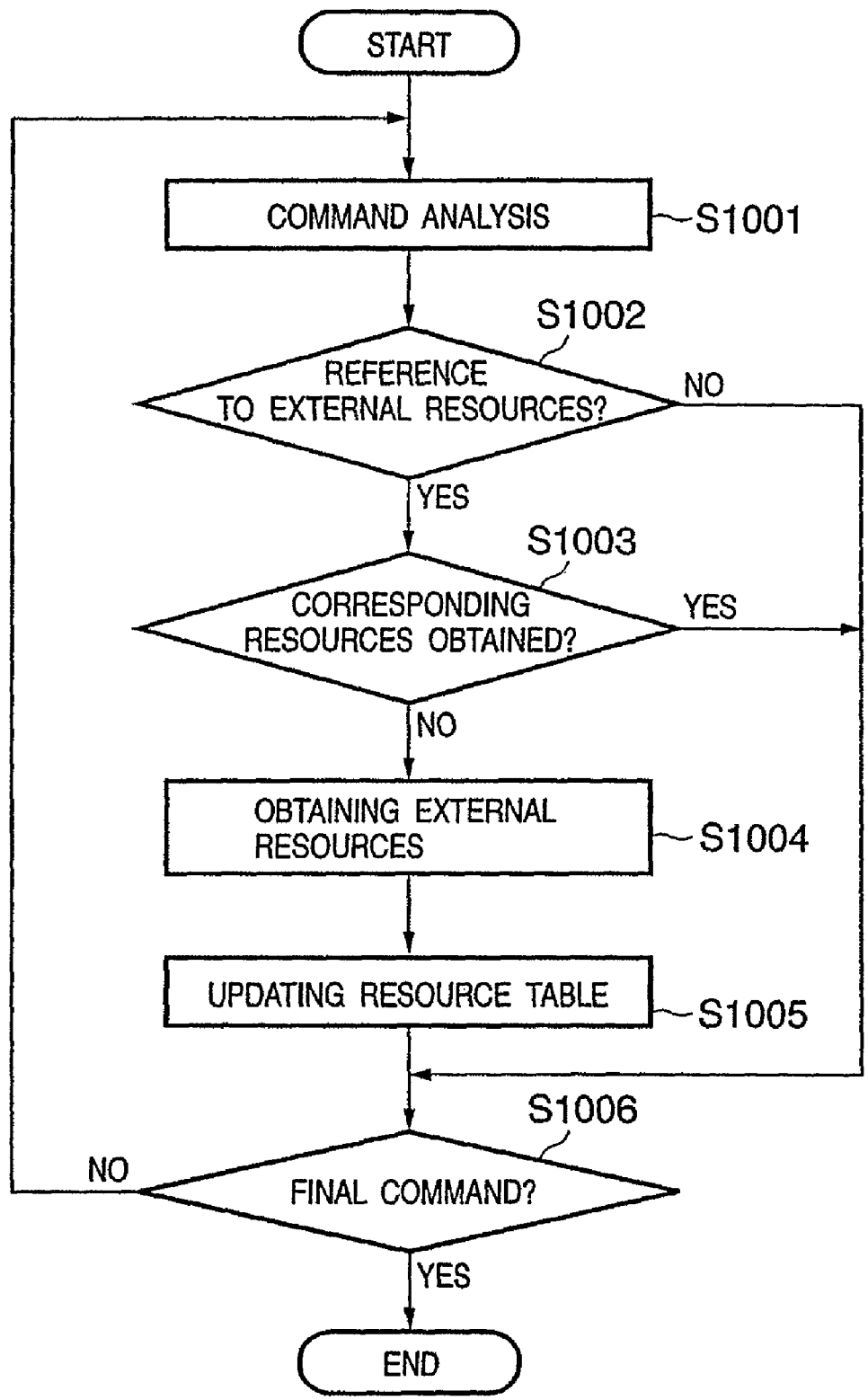
FIG. 10 is a flowchart of the command process by the sub-translator 302 according to the third embodiment of the present invention.

FIG. 9 is a flowchart of the command process performed by the main translator 301 according to the third embodiment of the present invention. FIG. 10 is a flowchart of the command process performed by the sub-translator 302 according to the third embodiment.

First, in step S901, the command of the input print data is analyzed. In step S902, it is checked whether or not the command has been issued to refer to external resources. If the command has not been issued to refer to the external resources, control is passed to step S903, and the command is processed. Then, in step S904, it is checked whether or not the command is the final command. If it is not the final command, control is returned to step S901, and the subsequent command is analyzed. If it is the final command in step S904, the process terminates.

On the other hand, if it is determined in step S902 that the command has been issued to refer to the external resources, then control is passed to step S905 to refer to the resource management table 800. Then, if the requested resources have not been obtained yet in step S906, then obtaining the resources by the sub-translator 302 is awaited. If the requested resources have already been obtained, then control is passed to step S907, the reference frequency counter 804 of the resource management table 800 is updated, control is passed to step S908, and the external resource process is performed. Then, control is passed to step S904, it is checked whether or not it is the final command. If it is not the final command, the above mentioned process is performed. If it is the final command, then the process terminates.

On the other hand, the sub-translator 302 analyzes the command of the input print data in step S1001 shown in FIG. 10. In step S1002, it is checked whether or not the command has issued to refer to the external resources. If the command has not been issued to refer to the external resources, then control is passed to step S1006, and it is checked whether or not the command is the final command. If it is not the final command, then control is returned to step S1001, and the subsequent command is analyzed. If it is the final command, then the process terminates.

If it is determined in step S1002 that the command has been issued to refer to the external resources, then control is passed to step S1003, and it is checked whether or not the external resources have already been obtained. If the external resources have already been obtained, then control is passed to step S1006, and the above mentioned process is performed. If the external resources have not been obtained, then control is passed to step S1004, the external I/F 103 obtains the external resources, and the resource management table 800 is updated in step S1005. Then, control is passed to step S1006, and the above mentioned process is performed.

Then, the reference frequency counter 804 of the resource management table 800 is checked at predetermined time intervals, and the process of the sub-translator 302 deleting or automatically updating the external resources based on the count value is described.

Figure 11:
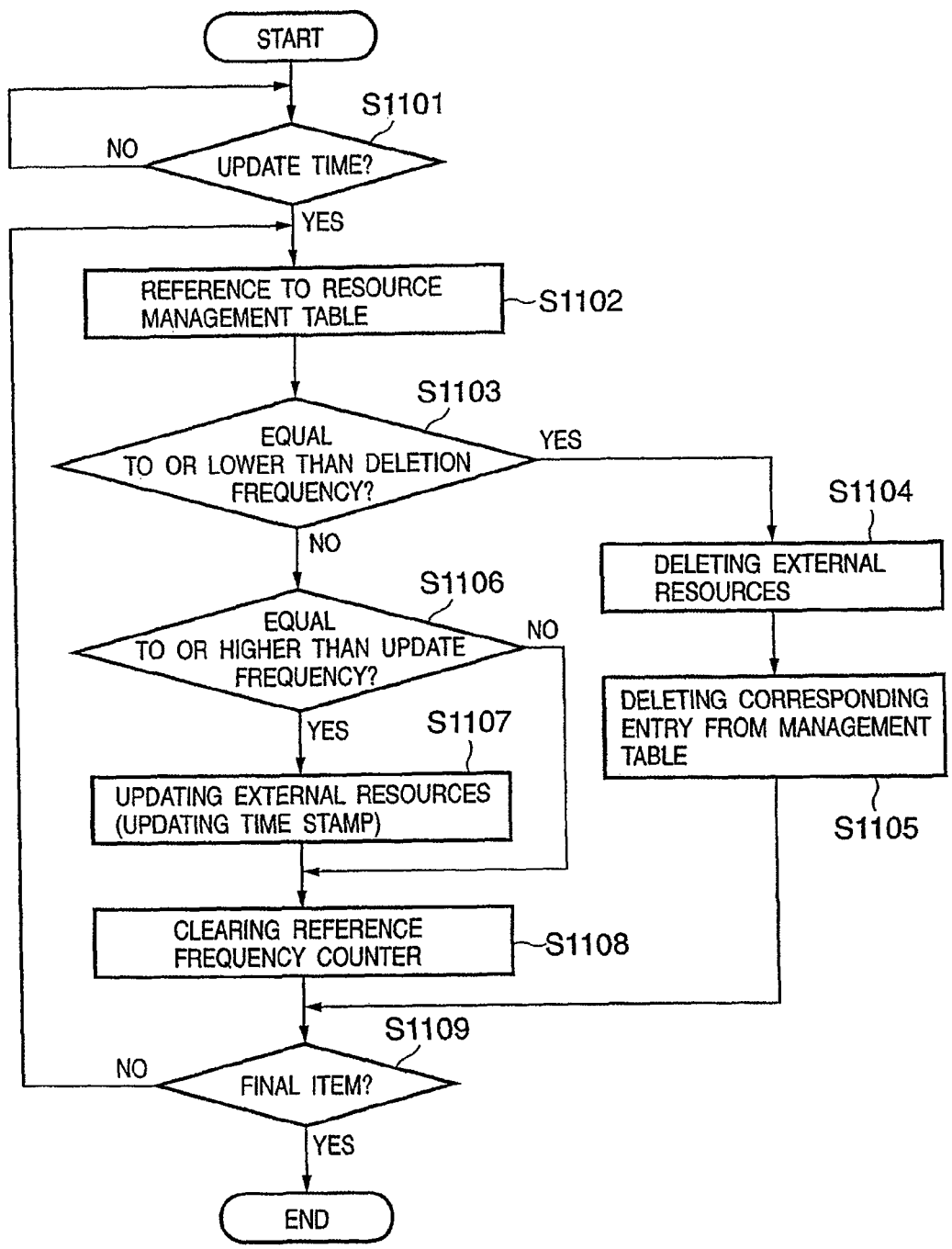
FIG. 11 is a flowchart of the process of updating the obtained external resources.

FIG. 11 is a flowchart of the process of updating the obtained external resources. First, in step S1101, it is checked whether or not it is time to update the external resources. If a predetermined time interval has passed, then control is passed to step S1102, and the reference frequency counter 804 for the external resources managed in order from the start of the resource management table 800 is checked. It is determined in step S1103 whether or not the count value of the reference frequency counter 804 is smaller than the deletion frequency set for determination of deletion. If it is smaller than the deletion frequency, then control is passed to step S1104, the external resources are deleted from the storage device 304, and the entry (the ID 801, the URI 802, the time stamp 803, and the reference frequency counter 804) of the external resources is deleted from the resource management table 800 in the following step S1105.

Then, in step S1109, it is checked whether or not there is an item in the resource management table 800. If there are any items remaining, control is returned to step S1102, and the above mentioned process is continued. If there are no items remaining, the process terminates.

On the other hand, in step S1103, if the external resources have been referred to more frequently than the deletion frequency of the external resources to be deleted, then control is passed to step S1106, and it is further checked whether or not the count value of the reference frequency counter 804 of the external resources is larger than the update frequency set for determination as to whether or not the updating process is to be performed. If the value is larger than the update frequency, then control is passed to step S1107, the external resources are obtained again, and the time stamp 803 of the external resources of the resource management table 800 are updated. When the count value is smaller than the update frequency in step S1106, control is passed to step S1108 when the external resources have been obtained in step S1107, and the reference frequency counter 804 of the external resources of the resource management table 800 is cleared.

Then, in step S1109, it is checked whether or not an item exists in the resource management table 800. If there is an item remaining in the resource management table 800, then control is returned to step S1102 to continue the above mentioned process. If there is no item remaining in the resource management table 800, then the process terminates.

According to the third embodiment of the present invention, when the image process is performed by fetching the resources in the network, a main translator (interpreter) for normally analyzing data, and a sub-translator (simple interpreter) only for referring to the resources are provided, data is analyzed and simultaneously the resources are fetched, data is output using the locally fetched resources, the locally fetched resources can be used when the resources are actually required, thereby shortening the time taken to fetch external resources, which normally takes a long time, and improving the throughput of the entire system.

Furthermore, by deleting and updating resources depending on the reference frequency of the fetched resources, the resources can be effectively utilized, and the convenience of the user can be improved.

Fourth Embodiment

The fourth embodiment of the present invention is described below by referring to the attached drawings.

According to the third embodiment, the sub-translator 302 obtains all external resources in advance, the main translator 301 always uses the resources stored in the storage device 304, and the obtained external resources are automatically deleted or updated depending on the reference frequency. However, there are cases where the external resources are not to be deleted regardless of the frequency, the original data of specific resources are frequently updated, or the newest possible resources are to be used.

Therefore, according to the fourth embodiment, a process is performed such that the latest possible resources can be obtained by suppressing automatic deletion or update, or forcibly obtaining specific resources.

The configuration of the image processing apparatus 100 according to the fourth embodiment is the same as the configuration according to the third embodiment, and only the differences from the third embodiment are described below.

First, according to the fourth embodiment of the present invention, the specific resources to be forcibly obtained are to be designated by the host computer 120 or the operation unit of the image processing apparatus 100. Then, as in the third embodiment, a command process is performed by the main translator 301 and the sub-translator 302.

Figure 12:
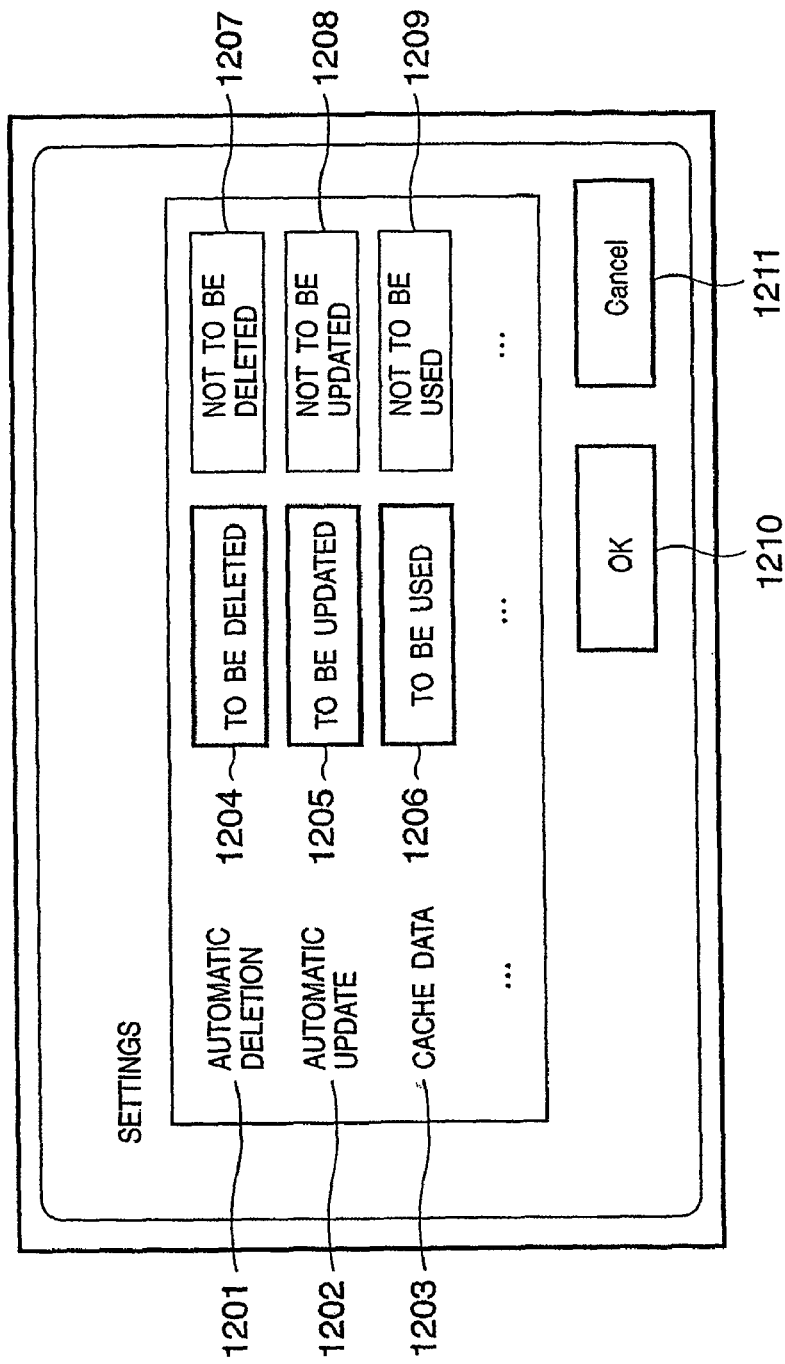
FIG. 12 shows the screen on which external resource process is set.

FIG. 12 shows the screen on which an external resource process is set. In FIG. 12, reference numeral 1201 denotes setting automatic deletion for setting whether or not external resources having a low reference frequency are to be deleted. Reference numeral 1202 denotes setting automatic update for setting whether or not external resources having a high reference frequency are to be updated. Reference numeral 1203 denotes setting cache data for setting whether or not already obtained external resources are to be used. The initial values of the settings are 'to be deleted' 1204 for the 'automatic deletion' 1201, 'to be updated' 1205 for the 'automatic update' 1202, and 'to be used' 1206 for the 'cache data' 1203 in the examples shown in FIG. 12.

By setting 'not to be deleted' 1207 for the 'automatic deletion' 1201, external resources are not deleted regardless of the reference frequency of the external resources. By setting 'not to be updated' 1208 for the 'automatic update' 1202, external resources are not updated automatically. When external resources are not automatically updated, the data to be actually output can be obsolete. In this case, it is desired that the 'cache data' 1203 is set as 'not to be used' 1209 to always obtain external resources. When the settings are changed, an 'OK' 1210 is pressed so that the change can be effective. When 'Cancel' 1211 is pressed, the changes up to that point are nullified.

When external reference data is pre-read, the 'cache data' 1203 is set as 'not to be used' 1209, and the process of forcible obtaining external resources is described below.

Figure 13:
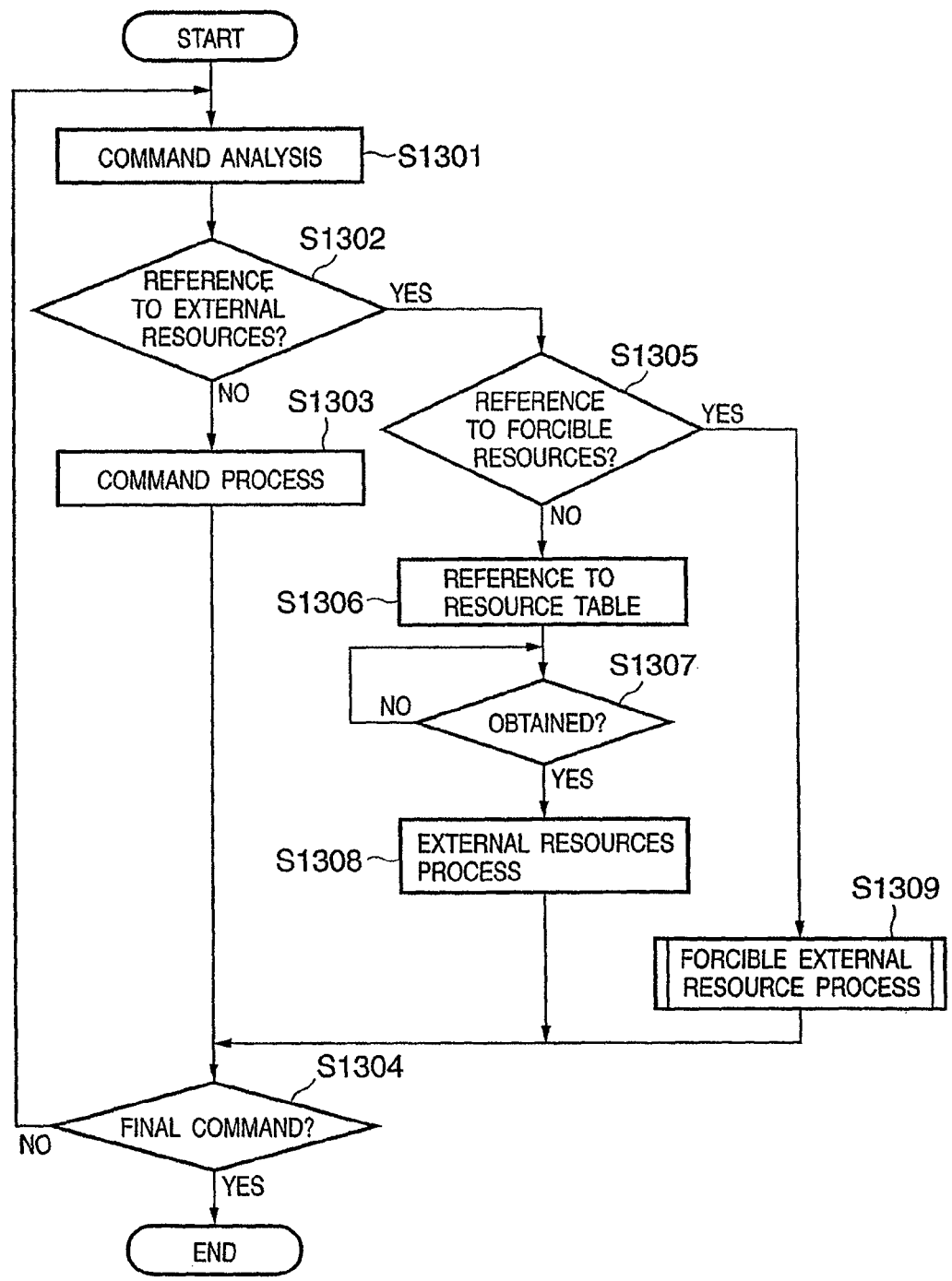
FIG. 13 is a flowchart of the resource forcibly obtaining process by the main translator 301 according to a fourth embodiment of the present invention.

FIG. 13 is a flowchart of the process of forcibly obtaining resources by the main translator. First, in step S1301, the command of the input print data is analyzed. In step S1302, it is checked whether or not the command has been issued to refer to external resources. If the command has not been issued to refer to the external resources, control is passed to step S1303, and the command is processed. Then, in step S1304, it is checked whether or not the command is the final command. If it is not the final command, control is returned to step S1301, and the subsequent command is analyzed. If it is the final command in step S1304, the process terminates.

On the other hand, if it is determined in step S1302 that the command has been issued to refer to the external resources, then control is passed to step S1305, and it is further checked whether or not an instruction to forcibly obtain the external resources has been issued. If the instruction has been issued, then control is passed to step S1309, the forcible external resource process is performed, and control is passed to step S1304. If the instruction to forcibly obtain the external resources has not been issued, then control is passed to step S1306 to refer to the resource management table 800. Then, if the requested resources have not been obtained yet in step S1307, then obtaining the resources by the sub-translator 302 is awaited. If the requested resources have already been obtained, then control is passed to step S1308, the external resource process is performed, and control is passed to step S1304.

According to the fourth embodiment, the latest data of the resources whose original data is frequently updated can be used by forcibly obtaining specific resources in addition to the effect of the third embodiment.

According to the fourth embodiment, specific resources are selected and forcibly obtained. However, all resources can be forcibly obtained. In this case, all resources are forcibly obtained, but referencing external resources in the same document does not obtain the resources again, thereby successfully improving the throughput of the entire system.

Fifth Embodiment

The fifth embodiment of the present invention is described below in detail by referring to the attached drawings.

According to the third and fourth embodiments, external resources are deleted or updated depending on the frequency in reference to the external resources and a predetermined timing. However, according to the fifth embodiment, obtained external resources are deleted or updated at an optional timing.

Figure 14:
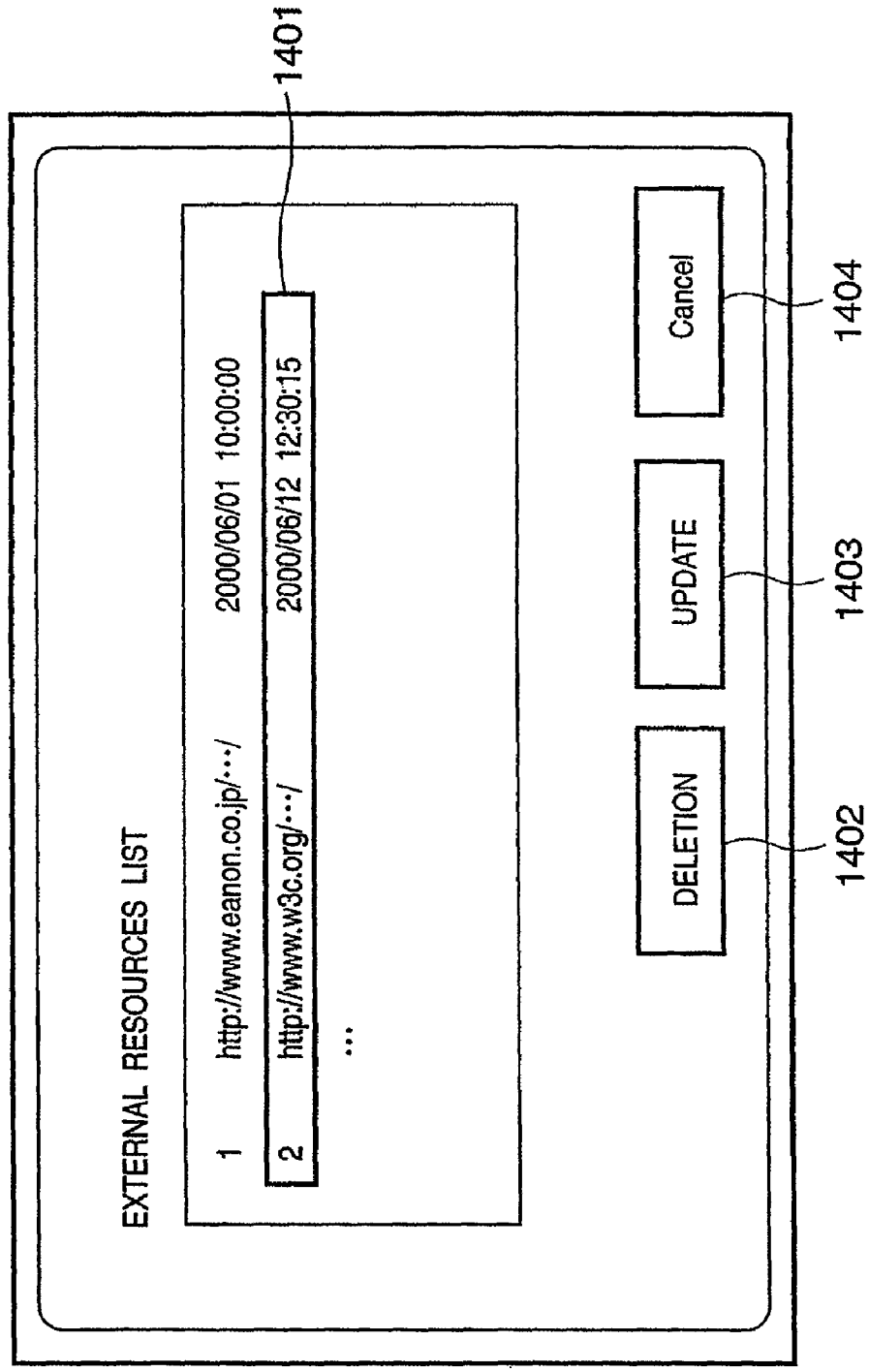
FIG. 14 shows the screen on which external resources are deleted or updated.

FIG. 14 shows the screen on which external resources are deleted or updated. As shown in FIG. 14, a list of already obtained external resources is displayed. If a user selects external resources to be deleted or updated, the selected external resources are inversely displayed as shown by 1401 in FIG. 14. After selecting the external resources from the list, a 'deletion' 1402 button is pressed for deletion, and a 'update' 1403 button is pressed for update. Either of the buttons is pressed, the confirmation screen as shown in FIG. 15 is pop-up displayed.

Figure 15:
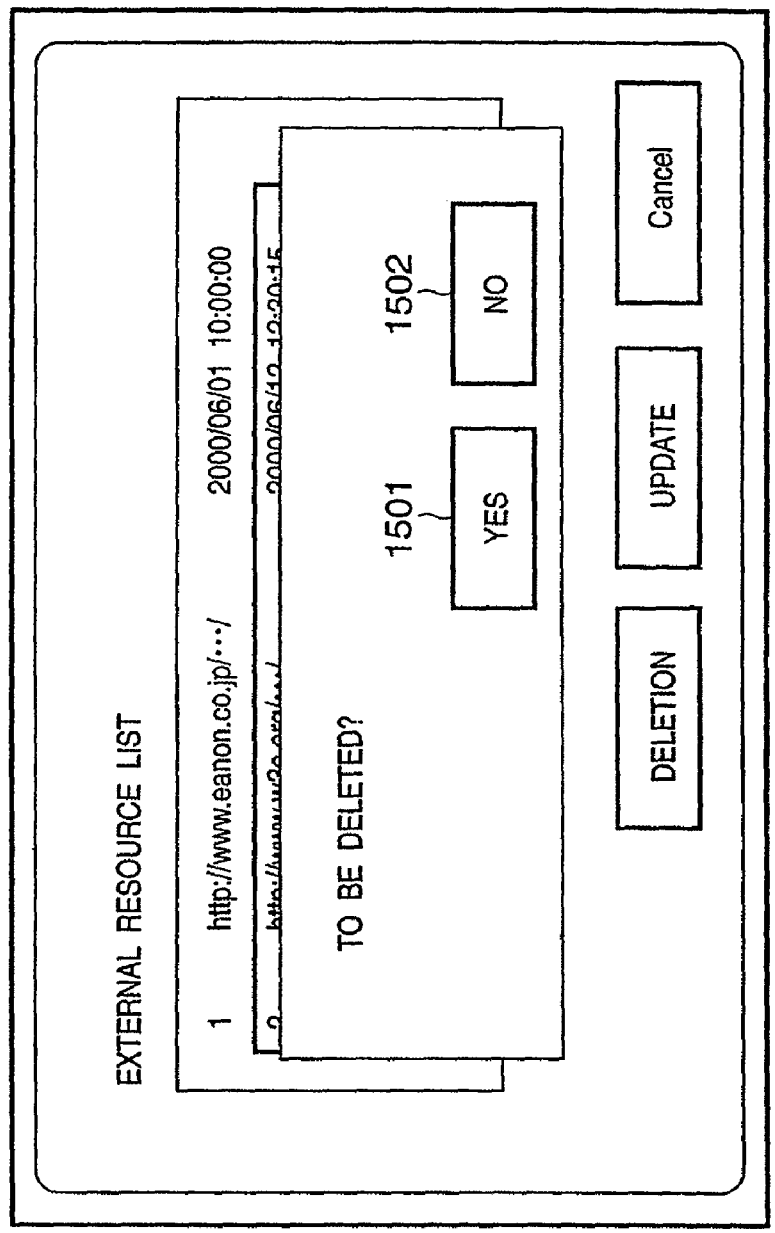
FIG. 15 shows a confirmation screen when a [deletion] 1402 button is pressed.

FIG. 15 shows a confirmation screen displayed when the 'deletion' 1402 button is pressed. Although not shown in the attached drawings, a similar confirmation screen is displayed when the 'update' 1403 button is pressed. If a 'yes' 1501 button is pressed, selected external resources can be deleted (or updated). If a 'no' 1502 button is pressed, the process is canceled, control is returned to the screen shown in FIG. 14, and external resources can be selected again. If a 'cancel' 1404 button shown in FIG. 14 is pressed, exit is made from the external resource selection screen.

According to the fifth embodiment of the present invention, external resources obtained at an optional timing can be deleted or updated, and the convenience of a user can be improved.

Sixth Embodiment

The sixth embodiment of the present invention is described below by referring to the attached drawings.

The configuration of the image processing system according to the sixth embodiment of the present invention is the same as the configurations according to the first to fifth embodiments described above by referring to FIGS. 1 to 15, and the descriptions are omitted here.

According to the sixth embodiment, when it takes a long time to obtain external resources due to a delay, etc. in communications on a page requiring the external resources, the print data on the corresponding page can be temporarily saved in the storage device 304, and the process on the next page is performed, thereby improving the process efficiency of the entire system.

Figure 16:
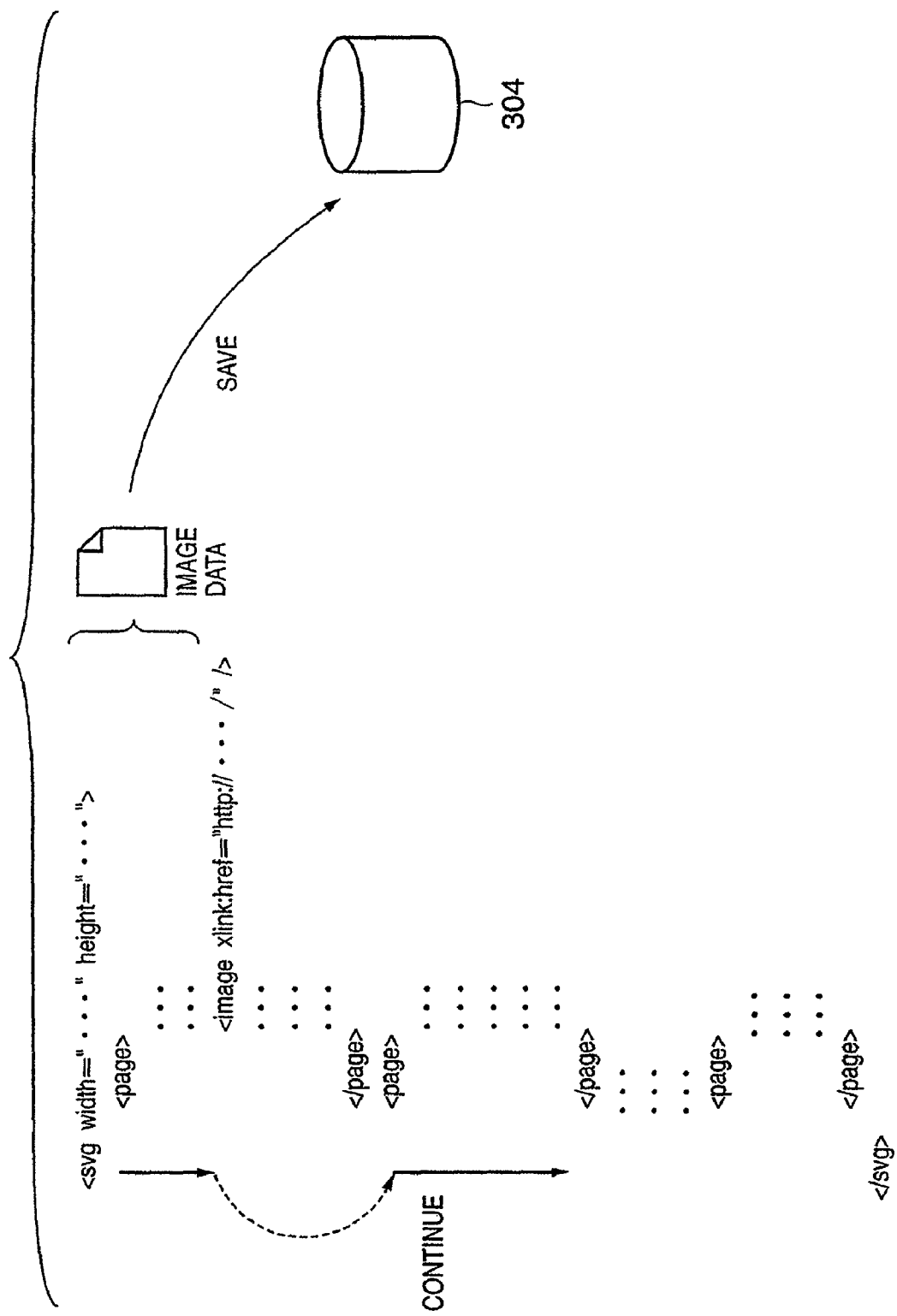
FIG. 16 shows the outline of the saving operation according to a sixth embodiment of the present invention.

FIG. 16 shows the outline of the saving operation according to the sixth embodiment. In FIG. 16, the portion encompassed by <svg> and </svg> is a piece of job data (document data). In the data, a plurality of portions encompassed by  and  are pages to be printed. In the example shown in FIG. 16, a command (a type of command to refer to external resources) to obtain an image (<image xlink: href="http:// . . . //"/>) is executed on the first page. However, if the sub-translator 302 cannot obtain the image data within a predetermined time-out due to a delay, etc. in the network, the main translator 301 temporarily saves the already generated image data for one page in the storage device 304, records the saving process in the page state management table described later, and starts the process of the next page.

FIG. 17 shows the page state management table according to the sixth embodiment. As shown in FIG. 17, a page state management table 1700 holds a page state 1702 as to whether the page of a page number 1701 is saved or the process has been completed. In the example shown in FIG. 17, the first and third pages are saved because the image cannot be obtained within a time-out, and the process of the second page is first completed. When the process of a new page is started, the system enters a page processing state.

When the main translator 301 shown in FIG. 3 requires external resources during the process of the print command on the first page based on the print data input from the host computer 120, the sub-translator 302 fetches the external resources through the network. However, when it takes a long time to obtain the external resources due to a delay, etc. in the communications, the main translator 301 temporarily saves the image data of the corresponding page in the storage device 304, and performs the process on the next page as described below.

Figure 18:
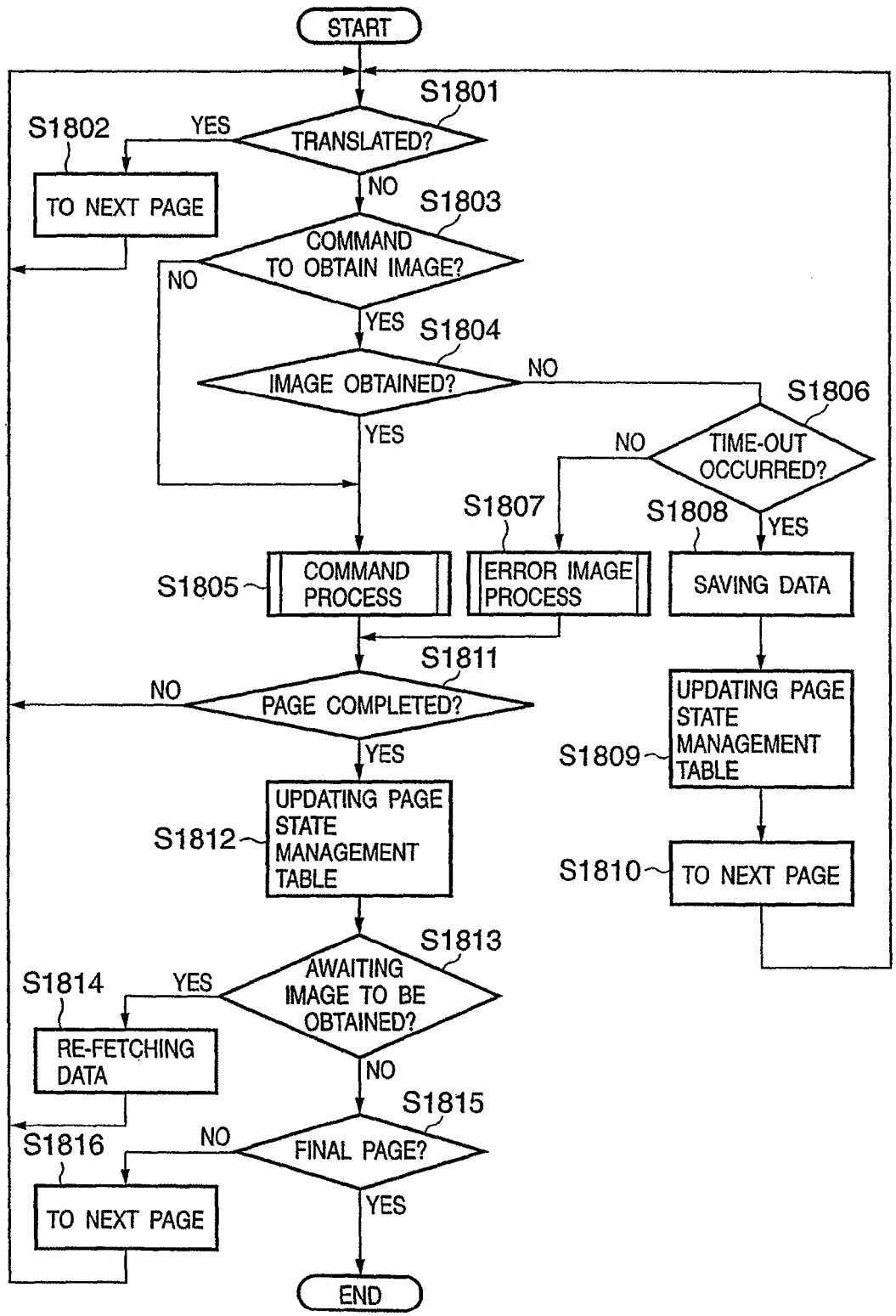
FIG. 18 is a flowchart of the page saving process according to the sixth embodiment of the present invention.

FIG. 18 is a flowchart of the saving process according to the sixth embodiment of the present invention. First, in step S1801, the main translator 301 refers to the page state 1702 of the page state management table 1700, and it is confirmed whether or not the page has already been translated by the main translator 301. At this time, if it has already been translated, then control is passed to step S1802, the subsequent page is processed, and control is returned to step S1801. If obtaining of the image is awaited on the page or a new page is to be processed in step S1801, control is passed to step S1803, the command corresponding the page is analyzed, and it is determined whether or not the current command is a command to obtain an image. If it is not a command to obtain an image, control is passed to step S1805, and the process corresponding to the command is performed as in step S503.

If the current command is a command to obtain an image, control is passed to step S1804. If the sub-translator 302 can obtain an image without any problem, control is passed to step S1805, and the command process is continued. If an image cannot be normally obtained, then control is passed to step S1806, and the cause of the problem is checked. If the problem of obtaining no image data is caused by anything but a time-out (for example, no corresponding image data, illegal image data format, etc.), then control is passed to step S1807, and the process corresponding to each error is performed. The details of each error process are not prescribed.

On the other hand, if the problem of obtaining no image data is caused by a time-out in step S1806, then control is passed to step S1808, and generated image data for one page is saved in the storage device 304. Then, in step S1809, the page state 1702 on the page number 1701 of the page state management table 1700 is changed into 'awaiting an image to be obtained', control is passed to the next page in step S1810, control is returned to step S1801, and the above mentioned process is continued.

Then, it is confirmed in step S1811 whether or not the current command is the final command of the page. If the end of page is not reached, control is returned to step S1801, and the above mentioned process is continued. If the current command is the final command of the page, then control is passed to step S1812, and the page state of the page state management table 1700 is changed into 'translation completed'. In step S1813, the page state 1702 of the page state management table 1700 is referred to, and it is confirmed whether or not there is a page in a wait state for an obtained image. If there is a page in the wait state for an obtained image, then control is passed to step S1814, the image data on the corresponding page saved in the storage device 304 is fetched again, control is returned to step S1801, and the above mentioned process is continued.

If there is no page in the wait state for an obtained image in step S1813, then control is passed to step S1815, and it is determined whether or not the current page is the final page of the job. If the page is not the final page, control is passed to step S1816, the next page is entered, and the process is continued. If the page is the final page of the job, the process terminates.

According to the sixth embodiment, the page in the wait state for an obtained image is fetched again when the next page is completely processed. However, the processes on all pages can be first completed, and then the page in the wait state for an obtained image can be processed.

According to the sixth embodiment, when obtaining image data is delayed in the same job, the translating process on the pages subsequent to the page is started. A page requiring no image to be obtained can be processed by priority, thereby improving the throughput of the entire system.

Seventh Embodiment

The seventh embodiment of the present invention is described below in detail by referring to the attached drawings.

According to the seventh embodiment, in addition to the process according to the sixth embodiment, if it is set that a job can be passed in case the image data obtaining process is delayed in the job, then the information about the job being processed is saved, the process of the next job is started, and the process of the saved job is resumed when the process of the next job is completed.

Figure 19:
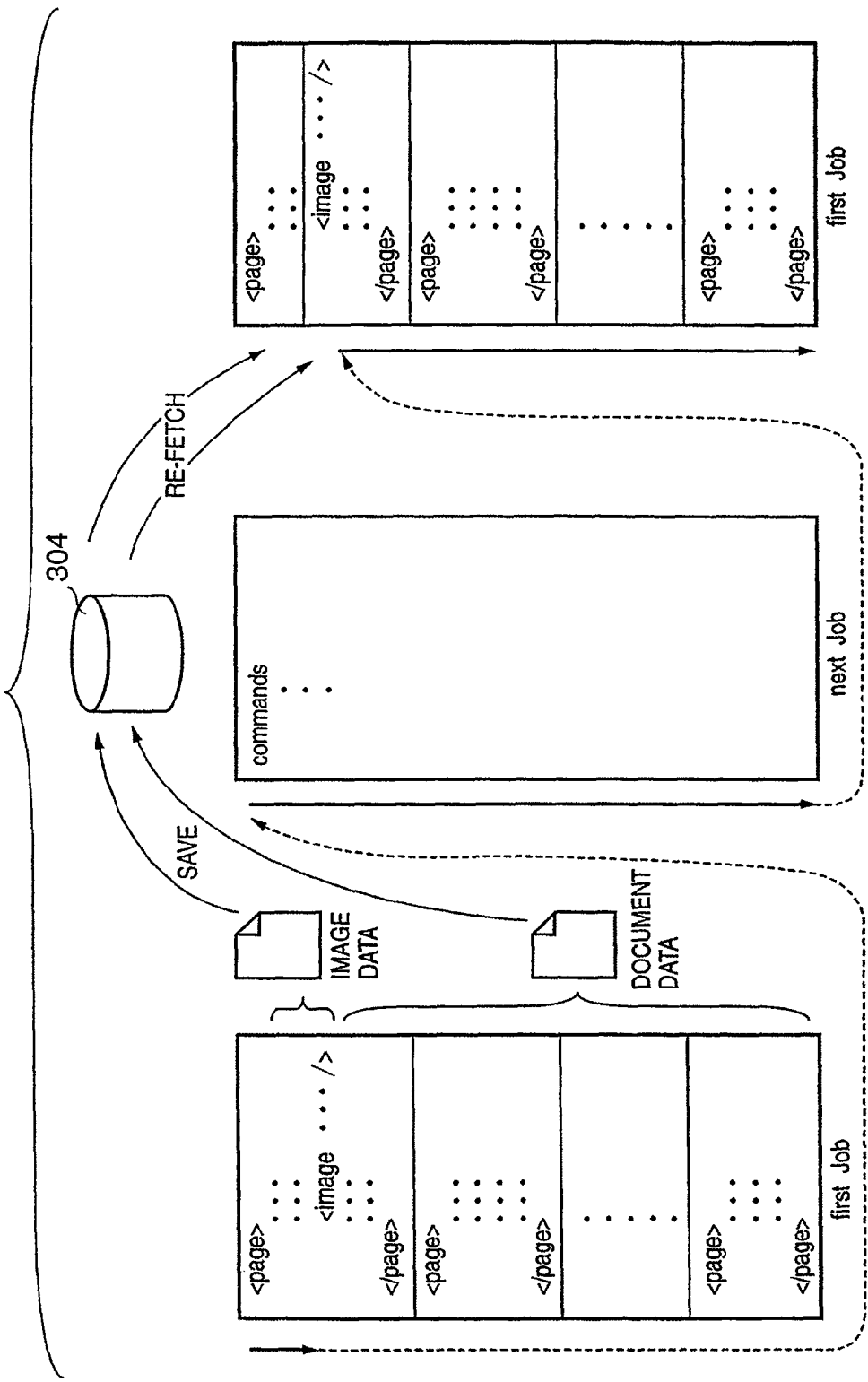
FIG. 19 shows the outline of the job passing operation according to a seventh embodiment of the present invention.

FIG. 19 shows the outline of a job passing operation according to the seventh embodiment. As shown in FIG. 19, if there is a command to obtain an image in the job being processed, and the obtaining process is delayed, then the generated image data and the document data of the job are saved, and the process is started on the next job. When the process on the next job is completed, the saved image data and document data are fetched again, and the process is resumed from the command to obtain the image.

Figure 20:
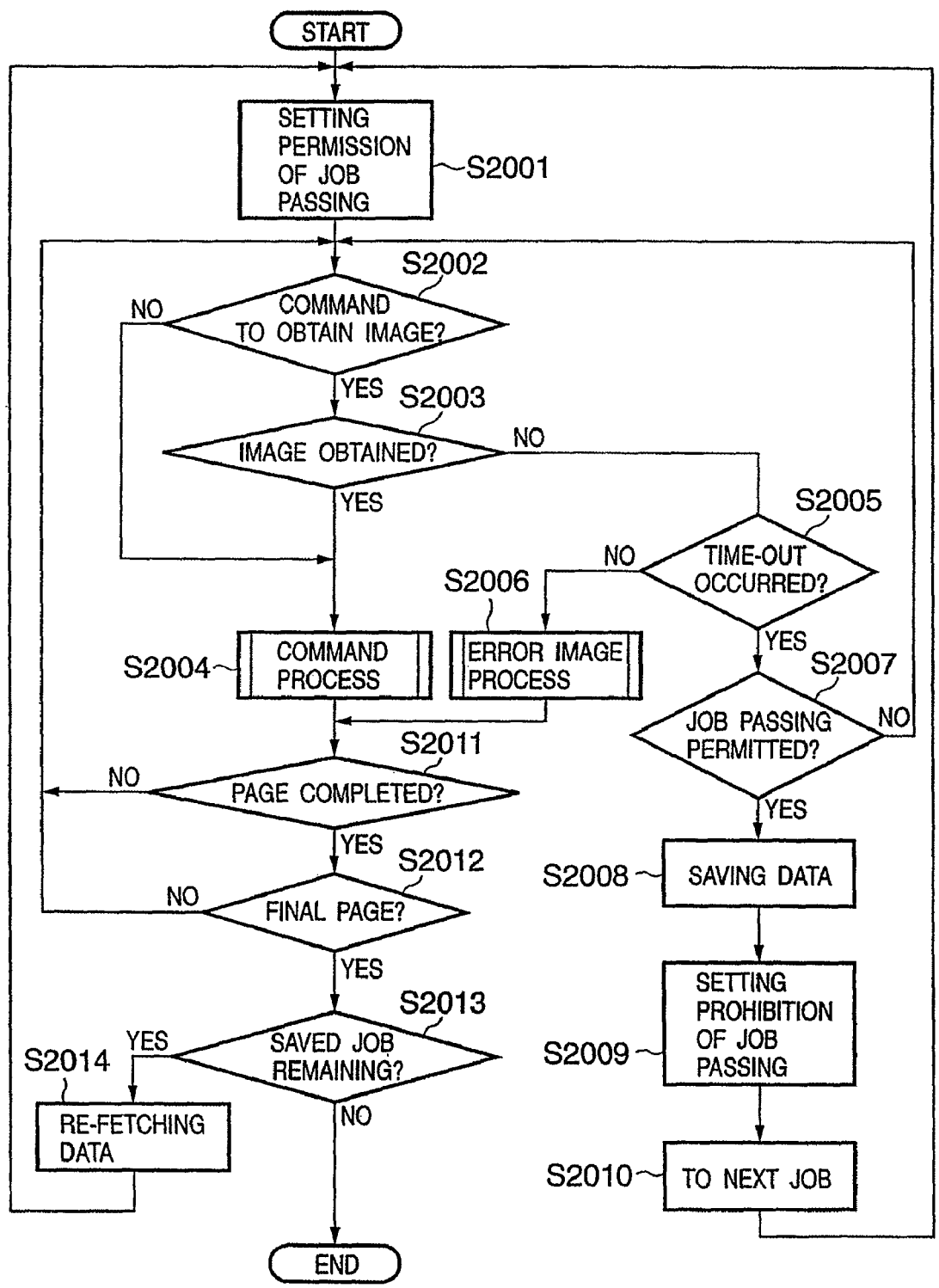
FIG. 20 is a flowchart of the job passing operation according to the seventh embodiment of the present invention.

FIG. 20 is a flowchart of the job passing process according to the seventh embodiment. First, in step S2001, the job passing process is set as permitted. Then, in step S2002, it is confirmed whether or not the current command is to obtain an image. If it is not a command to obtain an image, control is passed to step S2004, and the process corresponding to the command is performed. If it is a command to obtain an image, then control is passed to step S2003. If the sub-translator 302 can obtain an image without problem, then control is passed to step S2004, and the command process is continued. If the image cannot be normally obtained, then control is passed to step S2005, and the cause of the problem is checked. If the problem of obtaining no image is caused by anything but a time-out (for example, no corresponding image, illegal image format, etc.), then control is passed to step S2006, and the process corresponding to each error is performed. The details of each error process are not prescribed.

On the other hand, if the problem of obtaining no image is caused by a time-out in step S2005, then control is passed to step S2007, and it is checked whether or not passing a job is permitted. If it is not permitted in step S2007, then control is returned to step S2002, and an image obtaining process is attempted again. If it is permitted, then control is passed to step S2008, and already generated image data and job data are saved in the storage device 304. Then, in step S2009, passing a job is set as 'not permitted', and control is passed to the next job in step S2010, thereby continuing the process.

Then, it is determined whether or not the current command is the final command of the page in step S2011. If the end of the page has not been reached, then control is passed to step S2002, and the above mentioned process is continued. If the current command is the final command of the page, then control is passed to step S2012, and it is determined whether or not the page is the final page of the job. If the page is not the final page, then control is returned to step S2002, and the above mentioned process is continued. If the page is the final page of the job, then control is passed to step S2013, and it is checked whether or not there is a saved job. If there is a saved job, then control is passed to step S2014, the job is fetched again, control is returned to step S2001, and the process is continued. If there is not a saved job, the process terminates.

The process of passing a job can be set by the user interface provided by a printer driver of a host computer for each job, or can be set by an operation panel of the image processing apparatus each time the process is required.

According to the seventh embodiment, when the process of obtaining an image is delayed during the job requiring the image, and the document data of the job is saved and the next job is executed, thereby improving the throughput of the entire system.

The present invention can also be applied to a system comprising a plurality of appliances (for example, a host computer, an interface unit, a reader, a printer, etc.), or can be applied to a system comprising a single appliance (for example, a copying machine, a facsimile device, etc.).

Additionally, it is obvious that the object of the present invention can also be attained by providing a storage medium storing a program code of the software for realizing the function according to the above mentioned embodiments for a system or a device, and by the computer (CPU or MPU) of the system or the device reading and executing the program code stored in the storage medium.

In this case, the program code itself read from the storage medium realizes the functions of the above mentioned embodiments, and the storage medium storing the program code forms part of the present invention.

The storage medium for providing program code can be, for example, a floppy disk, a hard disk, an optical disk, a magneto-optical disk, CD-ROM, CD-R, a magnetic tape, a non-volatile memory card, ROM, etc.

Furthermore, by the computer executing the read program code, the functions of the above mentioned embodiments can be realized, and the OS (operating system), etc. operated by the computer can perform all or a part of the actual process, and the process can realize the functions of the above mentioned embodiments.

In addition, after the program code read from the storage medium is written to the memory provided in a function extending board inserted into the computer or the function extending unit connected to the computer, the CPU, etc. in the function extending board or the function extending unit can perform all or a part of the actual process at an instruction of the program code, and the functions of the above mentioned embodiments can be realized by the process.

The present invention has been described above in detail by referring to the preferred embodiments, but it is not limited to the above mentioned embodiments, but can be applied to various applications in the range described in the claims below.

What is claimed is:

1. An image processing apparatus comprising:
   a reception unit that receives, from an information processing apparatus, a print command including an instruction for obtaining data from an external device;
   a determination unit that determines whether or not data instructed to be obtained from the external device by the print command has already been stored in the image processing apparatus; and
   a print control unit that, in a case where it is determined by the determination unit that the data has already been stored in the image processing apparatus, controls printing using the stored data without obtaining the data from the external device, and in a case where it is determined by the determination unit that the data is not stored in the image processing apparatus, obtains the data from the external device and controls printing using the obtained data.

2. The apparatus according to claim 1, further comprising a storage unit that stores the data obtained from the external device.

3. The apparatus according to claim 2, further comprising a management unit that manages information indicating the data stored in the storage unit,
   wherein the determination unit determines whether or not the data is stored in the storage unit by referring to the information managed by the management unit.

4. The apparatus according to claim 1, wherein the print command transmitted from the information processing apparatus is described in an Extensible Markup Language (XML).

5. The apparatus according to claim 1, wherein the instruction for obtaining data from the external device includes identification information identifying the data, and
   wherein the print control unit obtains the data from the external device based on the identification information.

6. The apparatus according to claim 5, wherein the identification information is a Uniform Resource Identifier (URI).

7. The apparatus according to claim 6, wherein the external device is a World Wide Web (WWW) server.

8. The apparatus according to claim 1, further comprising a designation unit that designates data forcibly obtained from the external device,
   wherein, in a case where the data instructed to obtain from the external device by the print command is the data designated by the designation unit, the print control unit obtains data from the external device and controls printing using the obtained data even if the data has already been stored in the image processing apparatus.

9. A method of controlling an image processing apparatus comprising:
   a reception step of receiving, from an information processing apparatus, a print command including an instruction for obtaining data from an external device;
   a determination step of determining whether or not data instructed to be obtained from the external device by the print command has already been stored in the image processing apparatus; and
   a print control step of, in a case where it is determined in the determination step that the data has already been stored in the image processing apparatus, controlling printing using the stored data without obtaining the data from the external device, and in a case where it is determined in the determination step that the data is not stored in the image processing apparatus, obtaining the data from the external device and controlling printing using the obtained data.

10. A non-transitory computer-readable storage medium storing a program for causing a computer to execute a program that causes a processor to perform the method defined in claim 9.

* * * * *